UNITED STATES PATENT OFFICE.

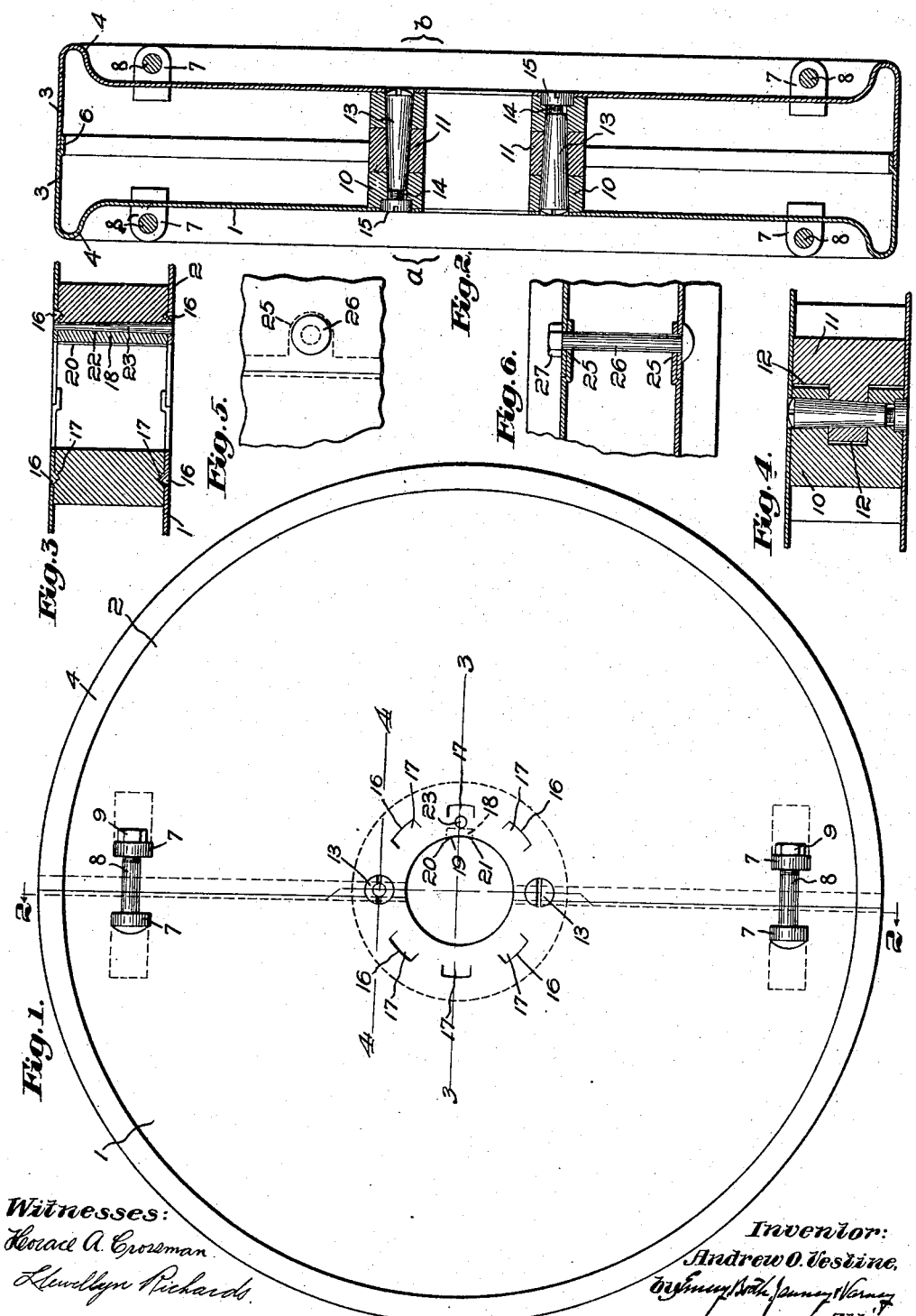

ANDREW O. VESTINE, OF WORCESTER, MASSACHUSETTS.

PULLEY.

1,217,371.  Specification of Letters Patent.  Patented Feb. 27, 1917.

Application filed March 9, 1915. Serial No. 13,270.

*To all whom it may concern:*

Be it known that I, ANDREW O. VESTINE, a citizen of the United States, and a resident of Worcester, county of Worcester, State of Massachusetts, have invented an Improvement in Pulleys, of which the following description, in connection with the accompanying drawings, is a specification, like characters on the drawings representing like parts.

This invention relates to wheels, and particularly to pulleys, and its aim is to provide an improved pulley simple in construction, light in weight, comparatively inexpensive to manufacture, and possessing other advantages hereinafter referred to, among which is the fact that it is dust proof.

Of the drawings illustrating, for better understanding thereof, one embodiment of my invention which I have described herein, Figure 1 is a side view;

Fig. 2, a vertical section on the lines 2—2, Fig. 1;

Fig. 3, a horizontal sectional detail on the lines 3—3 of Fig. 1, of the hub and manner of securing the same to the side members;

Fig. 4, a horizontal sectional detail on the lines 4—4, Fig. 1, showing the method of locking the hub members together;

Fig. 5, a detail of a modified means for locking the side members together, and

Fig. 6, a sectional detail of the same construction.

My improved pulley may be constructed of any suitable material, as metal. It is preferably hollow, for lightness, and, while it may comprise as many parts as convenient, it is here shown, see Fig. 2, as comprising two similar side members, as I term them, *a*, *b*. Each side member may be and is herein shown as built up of a plurality, in this case two, of segmental members 1, 2, each, as shown, being substantially, in size, one-half of one of the side members *a*, *b*. These members 1, 2, are preferably struck up in any convenient manner to provide a substantially flat edge portion 3, reinforcing rib 4, and side *a*.

The edge 3 of the member *a* is offset at any convenient point to provide a flange 6, which may be as wide as desired, and adapted to receive thereon the edge 3 of the opposite member *b*, which may be secured thereto if desired, as by welding, to strengthen the pulley and provide a smooth outer edge to receive the belt, not shown. Each segmental member 1, 2, is provided, at suitable points thereon, with a laterally extended locking ear 7, which may be secured conveniently to the face of the segmental member, as to the inner face thereof, as herein, and extended laterally through an aperture therein. These ears may be connected and locked together by any suitable means, as a screw 8, and nut 9 therefor.

The hub may consist, see Figs. 2 and 4, of a plurality of members 10, 11, herein arcuate in form, the adjoining edges of which are interlocked to secure a rigid engagement thereof. A space 12, Fig. 4, is preferably left for clearance so that the members may be tightly drawn together.

For locking the hub members together I have provided novel means which comprises, see Figs. 2 and 4, a pin 13, tapered if desired, provided with a threaded end 14, to receive thereon a nut 15. These members 13 may be locked on opposite sides of the pulley to provide equally distributed locking pressure. The segmental members 1, 2, and the hub members 10 and 11 are drilled to receive the pin 13 on one side while the opposite side member and the adjoining hub face are counter-bored to receive the nut 15.

To lock the members 1, 2, to the hub members 10, 11, see Fig. 1, I preferably provide the hub members with one or more radially positioned grooves 16 which may be V-shaped for convenience. Lips 17 on the side members 1, 2, are then cut out and depressed into the V-shaped grooves 16 and thus serve to securely lock the members 1, 2, to the hub members.

If preferred the lips 17 may be spot-welded in the grooves 16 in any convenient manner.

For securing the hub to the shaft, I have provided novel means. The hub is preferably milled out to receive a key having one curved face 19, providing shaft-biting edges 20, 21. Adjoining the key seat or convenient thereto, Figs. 1, 3, the hub is drilled or otherwise recessed as at 22 to receive a key locking member 23, as a tapered pin, the size of the aperture being such as to receive the pin loosely when the hub 10 fits the shaft 24 loosely, and adapted to be tightened therein by the driving home of the pin. As the tapered pin 23 is driven onto the seat it forces the key 18 snugly between the shaft 24 and the key seat. The sharp edges 20, 21, of the key will bite the shaft sufficiently tight to prevent the pulley turning on the shaft whichever way the latter is rotated.

In Figs. 5, 6, I have shown a modified form of construction for locking two of the segmental members 1, 2, together. In this case the member 1, for instance, may be provided with an ear 25 offset to be received against one face of the adjoining member 2. Both members may then be drilled to receive a bolt or other suitable member 26 the same being secured at the opposite side of the pulley as by a nut 27.

A pulley constructed as described is dust proof, which is a distinct advantage. A pulley of the foregoing construction also offers little opportunity for dust to accumulate thereon as it has no spokes and the outside thereof is free from dust-catching members.

The examination of mills today by insurance companies carrying insurance thereon is very strict and, so far as possible, mills are required to prevent accumulation of dust on and in pulleys as such dust, especially when oily or greasy, is very inflammable and conducive to explosions. Such a pulley may be readily locked to and unlocked from a shaft, is inexpensive, strong and adds little weight to the shaft.

Obviously my invention may be modified in many details without departing from the spirit thereof, and I claim:

1. A pulley comprising a plurality of side members fashioned from sheet material and engaging each other along their curvilinear edges, one side member comprising a plurality of segmental members, a hub comprising a plurality of arcuate members, the hub members respectively secured together along their adjoining edges.

2. A pulley comprising a plurality of side members fashioned from sheet material, a hub therefor comprising a plurality of arcuate members having interlocking edges, a tapered locking member inserted through and drawing said arcuate members tightly together, and means for locking the hub to the shaft comprising a key having a shaft-biting edge, and means, comprising a pin adapted to be driven through the hub adjacent the key to lock the key therein, and to lock the hub to the shaft.

3. A hollow dust tight pulley comprising a plurality of side members fashioned from sheet material and secured together at their peripheral edges, the edges being relatively offset, each side member comprising a plurality of segmental members having their adjoining edges relatively offset, the offset edges providing shoulders for the edges of the abutting member, and means for drawing said segmental members and side members together.

In testimony whereof, I have signed my name to this specification in the presence of two subscribing witnesses.

ANDREW O. VESTINE.

Witnesses:
EVERETT S. EMERY,
F. IRENE CHANDLER.